United States Patent [19]

Kuroiwa

[11] Patent Number: 4,770,606

[45] Date of Patent: Sep. 13, 1988

[54] CENTRIFUGAL COMPRESSOR

[76] Inventor: Kazuo Kuroiwa, 750-186, Shirane-cho, Asahi-ku, Yokohama-shi, Kanagawa-ken, Japan

[21] Appl. No.: 891,971

[22] Filed: Aug. 1, 1986

[30] Foreign Application Priority Data

Aug. 5, 1985 [JP] Japan .................................. 60-171017
Nov. 25, 1985 [JP] Japan .................................. 60-262660

[51] Int. Cl.⁴ ............................................. F04D 1/06
[52] U.S. Cl. ................................... 415/199.1; 415/73
[58] Field of Search ................. 415/199.1, 198.1, 73, 415/74, 90

[56] References Cited

U.S. PATENT DOCUMENTS 4,116,583  9/1978  Budris ........................ 415/199.1
4,307,995 12/1981  Catterfeld ................... 415/199.1

Primary Examiner—Larry I. Schwartz
Attorney, Agent, or Firm—Beveridge, DeGrandi & Weilacher

[57]  ABSTRACT

A centrifugal compressor having a rotor driven by a motor for rotation about a shaft which is provided at its one end with an inlet opening of the gas to be compressed and on its opposite end with an outlet opening. The rotor has radial centrifugal compression passages connected to the inlet opening, annular circumferential diffusers connected to the outer ends of the compression passages, and centripetal passages extending from the diffusers. Devices for preventing the gas from rotating in the circumferential diffusers are also provided.

24 Claims, 9 Drawing Sheets

CENTRIFUGAL COMPRESSOR

BACKGROUND OF THE INVENTION

1. Field of the Invention

The present invention relates to a centrifugal compressor which can be adapted to compress gas, such as a gaseous coolant in a refrigeration cycle.

2. Description of the Related Art

There are mainly three kinds of compressors, i.e. centrifugal compressor, reciprocating compressor and rotary compressor. Among these compressors, a centrifugal compressor to which the subject of the present invention is directed has a basic arrangement in which rotary compressor blades are accommodated in a stationary casing with diffusers on its periphery. The gas to be compressed in introduced into the casing through a central portion of the compressor blades and the compressed gas is discharged from the peripheral portion of the casing connected to the diffusers. In this known arrangement of the centrifugal compressor, there are fatal drawbacks in which a large friction occurs in a sealing mechanism of the compressor, and the compression efficiency substantially depends on the manufacturing precision of components of the compressor, particularly on an accuracy of a gap between the casing and the compressor blades. The inaccuracy results in a large mechanical loss, a large sealing loss and a large friction loss.

The primary object of the present invention is to eliminate the above mentioned drawbacks of the prior art by providing a new centrifugal compressor having a large compression ratio with a small capacity.

SUMMARY OF THE INVENTION

In order to achieve the object mentioned above, according to the present invention, there is provided a centrifugal compressor comprising a rotor which can rotate about a shaft and which has an inlet opening at one end of the shaft, at least one centrifugal compression passage which is connected to the inlet opening and which extends outward from the center portion of the shaft about which the rotor rotates, an annular circumferential diffuser connected to an outer end of the centrifugal compression passage, at least one centripetal passage which extends from the diffuser toward the center of the shaft of the rotation of the rotor, an outlet opening at the opposite end of the shaft of the rotor, and means for preventing the gas flow in the diffuser from rotating.

The rotor mentioned above can be held in a hollow casing, together with a motor for driving the rotor. In this arrangement, a vacuum sealing device which provides a high speed gas flow in boundary portions or connections between the inlet opening and/or the outlet opening and the casing can be provided to reduce the pressure of gas in the casing and the friction of the rotor and also to increase a cooling efficiency of the motor. In addition, the high speed gas flow ejected from the vacuum sealing device can be introduced into a centrifugal speed reducing and pressure increasing device to smoothly decrease the speed and to smoothly increase the pressure.

BRIEF DESCRIPTION OF THE DRAWINGS

The invention will be described below in more detail with reference to the accompanying drawings, in which.

DESCRIPTION OF THE PREFERRED EMBODIMENT

Figure 1:
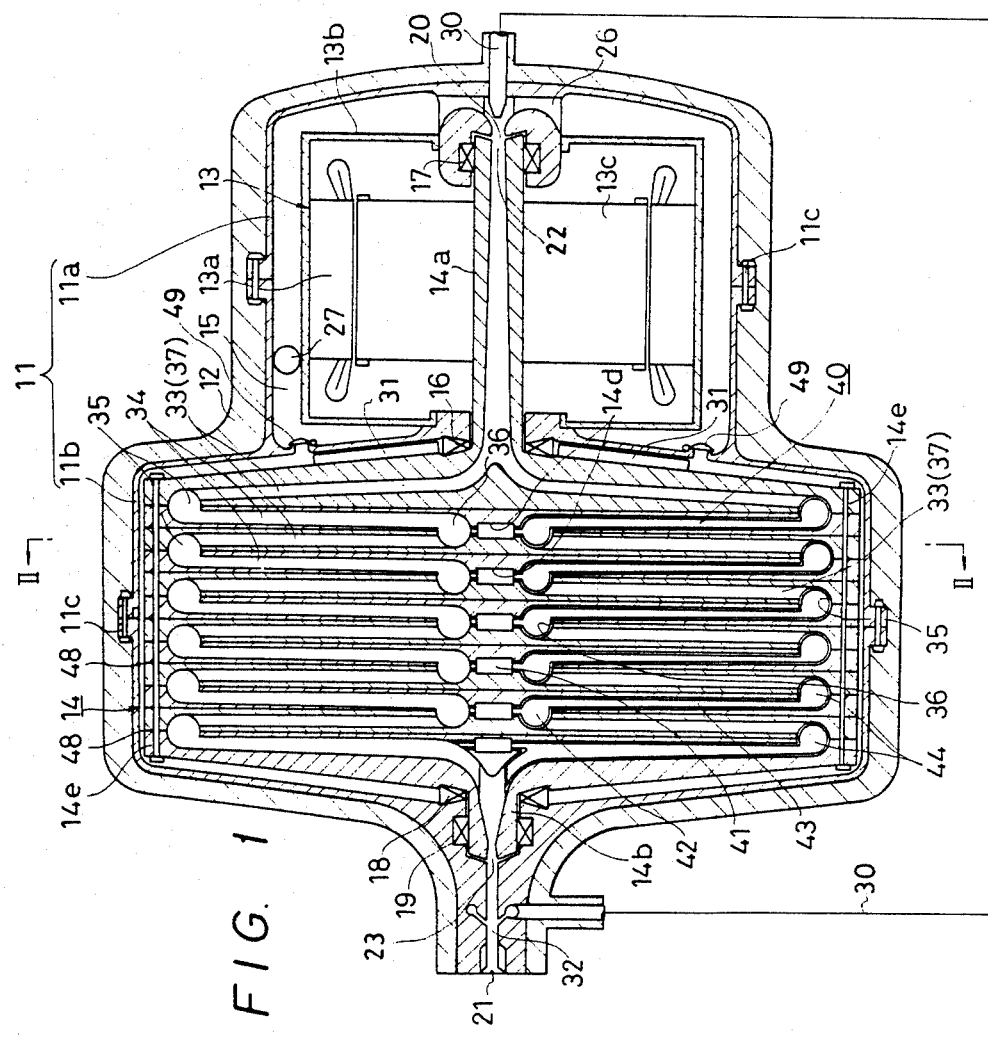
FIG. 1 is a longitudinal sectional view of a centrifugal compressor according to an embodiment of the present invention.

The invention will be described below with reference to the drawings which show different embodiments of the present invention. FIG. 1 shows a fundamental construction of the centrifugal compressor of the first embodiment of the present invention. In FIG. 1, an immovable portion includes a casing 11, a heat insulator 12 covering the casing 11, and a stator 13a of a motor 13 which is enclosed in the casing 11. The casing 11 is different from a casing of a conventional centrifugal compressor and is in the form of a hollow body without any diffuser on its periphery. The casing 11 has a smaller diameter portion 11a accommodating the motor 13 and a large diameter portion 11b accommodating the rotor 14. The casing 11 is positioned so that its axis extends in the horizontal direction. To the inner side of the smaller diameter portion 11a of the casing 11 is secured a motor casing 13b which has the stator 13a of the motor 13 integral therewith, through an annular gap 15 between the casing portion 11a and the motor casing 13b. The casing portions 11a and 11b are connected to each other by means of connectors 11c. The rotor 14 is rotatably located in the casing 11. The rotor 14 has a center shaft about which the rotor rotates and which has an inlet pipe (inlet opening) 14a at its one end and a discharge pipe (outlet opening) 14b at its opposite end. The inlet pipe 14a extends in the smaller diameter portion 11a of the casing 11 and is rotatably supported by bearings 16 and 17. The discharge pipe 14b is rotatably supported by bearings 18 and 19 in the casing 11. A rotor 13c of the motor 13 is secured to the outer periphery of the inlet pipe 14a, so that when the electrical power is supplied to the motor 13, the rotor 14 rotates together with the rotor 13c of the motor 13 in the casing 11.

The casing 11 is provided with an inlet port 20 which is connected to the inlet pipe 14a and an outlet port 21 which is connected to the discharge pipe 14b. At boundary or connecting portions between the casing 11 and the inlet pipe 14a and between the casing 11 and the discharge pipe 14b are provided vacuum sealing devices 22 and 23 which enable the gas to pass therethrough at a high speed. Namely, the vacuum sealing devices 22 and 23 are free from mechanical friction and perform both the sealing function and the vacuum function so as to produce a thermodynamically and dynamically high speed gas flow. In the illustrated embodiment, the vacuum sealing devices 22 and 23 are of substantially conical passage shape having expansion passes and restrictions to provide a thermodynamically supersonic speed gas flow. It is also possible to manually or automatically change the cross sectional area of the gas passage in the vacuum sealing devices 22 and 23 in accordance with temperature or pressure of the gas to be used.

When the gas passes through the vacuum sealing devices at high speed, the dynamic pressure of the gas flow increases and the static pressure thereof decreases. As a result of this, the gas in the casing 11 (the motor casing 13b) is sucked into the inlet pipe 14a and the discharge pipe 14b, resulting in reduction of pressure, or production of vacuum. Accordingly, the mechanical friction of the rotor 14 and the motor 13 can be decreased, resulting in an increase of a cooling effect of the motor 13 and also in prevention of a leakage of the compressed gas. It will be appreciated that only the vacuum sealing device 23 at the gas outlet side (i.e. high pressure side) of the rotor 14 can be provided and the vacuum sealing device 22 on the gas inlet side (lower pressure side) of the rotor can be dispensed with.

The inlet port 20 of the casing 11 comes into communication with the annular gap 15 through a radial passages 26 of the casing 11. An introduction port 27 of the gas to be compressed opens into the annular gap 15. A bypass pipe 30 opens into the inlet port 20. The bypass pipe 30 is provided on its front open end, with a nozzle which forms an ejector in the vicinity of an inlet portion of the inlet port 20 to suck the surrounding gas by the ejected gas, thereby to increase the speed of the gas in the vacuum sealing device 22, resulting in an increase of a final enthalpy thereof. On the other hand, the bypass pipe 30 is connected to a vacuum sealing device 32 for prevention of surging provided in the gas passage connected to the discharge pipe 14b in the casing 11. The vacuum sealing device 32 keeps vacuum and sealing functions until the gas flow is restricted to prevent the gas from reversing. Once the gas flow is restricted, the excess gas can be automatically returned to the inlet side of the rotor through the bypass pipe 30 in order to prevent surging. At this time, the vacuum sealing device 23 at the outlet side of the rotor 14 maintains the vacuum and sealing function, and accordingly the mechanical friction of the rotor 14 and the motor 13 is small, thus resulting in an increase in the cooling effect of the motor 13.

The rotor 14 compresses the gas which is introduced from the inlet pipe 14a and discharges the compressed gas from the outlet pipe 14b. In the illustrated embodiment, the compressor is of six-stage type, each stage comprising a centrifugal compression passage 33 extending radially and outward from the center of the rotor 14, a centripetal passage 34 extending from the periphery of the rotor 14 toward the center thereof, an annular circumferential diffuser coaxial to the rotor 14 for connecting the outer ends of the centrifugal passage and the centripetal passage, and a central diffuser 36 coaxial to the rotor 14 for connecting the inner end of the centrifugal compression passage 33 and the inner end of the adjacent centripetal passage 34. The centrifugal compression passage 33 closest to the inlet pipe 14a is connected to the inlet pipe 14a and the centripetal passage 34 closest to the outlet pipe 14b is connected to the outlet pipe 14b.

The compression passage can be at least one stage, although the six-stage compression passages are provided in the illustrated embodiment. In the one-stage compression passage, the central diffuser 36 can be dispensed with and the centripetal passage 34 can be directly connected to the discharge pipe 14b.

Figure 2:
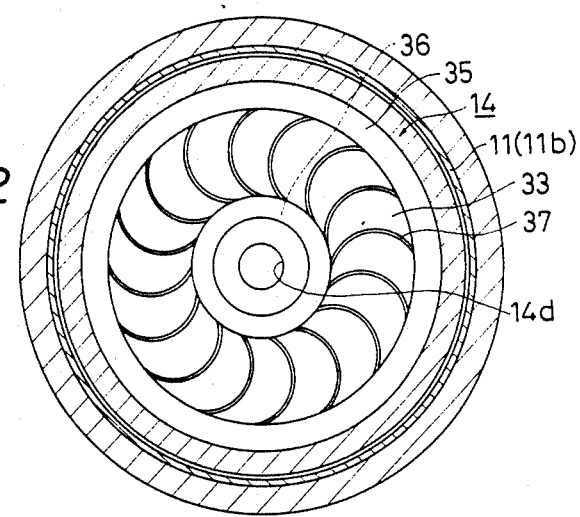
FIG. 2 is a sectional view taken along the line II—II in FIG. 1.
Figure 3:
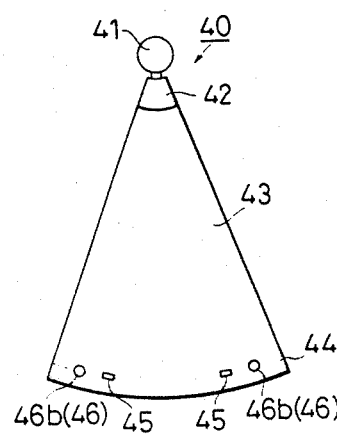
FIGS. 3, 4 and 5 are plan view, side elevational view, and rear elevational view of a diffuser and a centripetal passage and means in the diffuser for preventing the gas flow from rotating, respectively.
Figure 4:
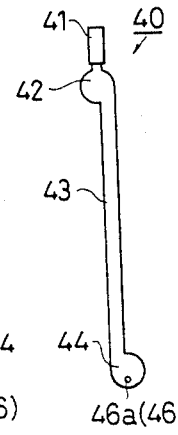
Figure 5:
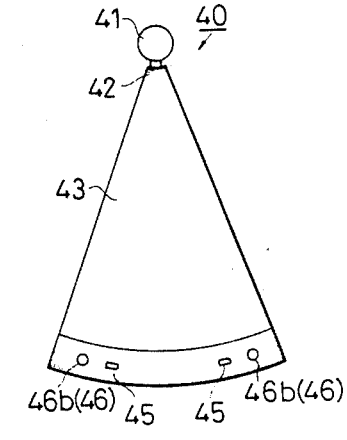
Figure 6:
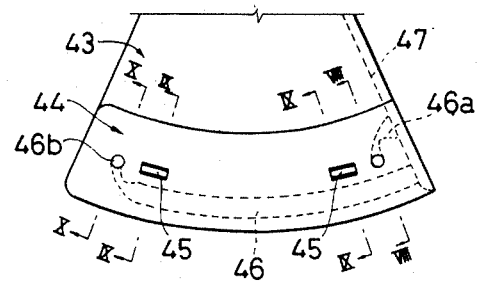
FIG. 6 is an enlarged partial view of FIG. 5.
Figure 7:
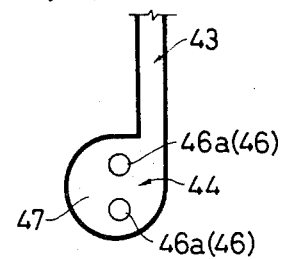
FIG. 7 is a right hand side elevational view of FIG. 6.
Figure 8:
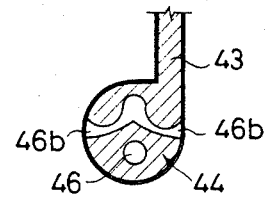
FIG. 8, 9 and 10 are sectional views taken along the lines VIII—VIII, IX—IX, and X—X, in FIG. 6, respectively.
Figure 9:
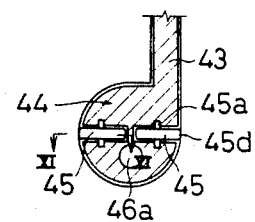
Figure 10:
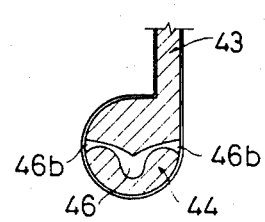
Figure 11:
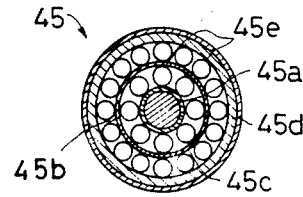
FIG. 11 is a sectional view taken along the line XI—XI in FIG. 9.
Figure 12:
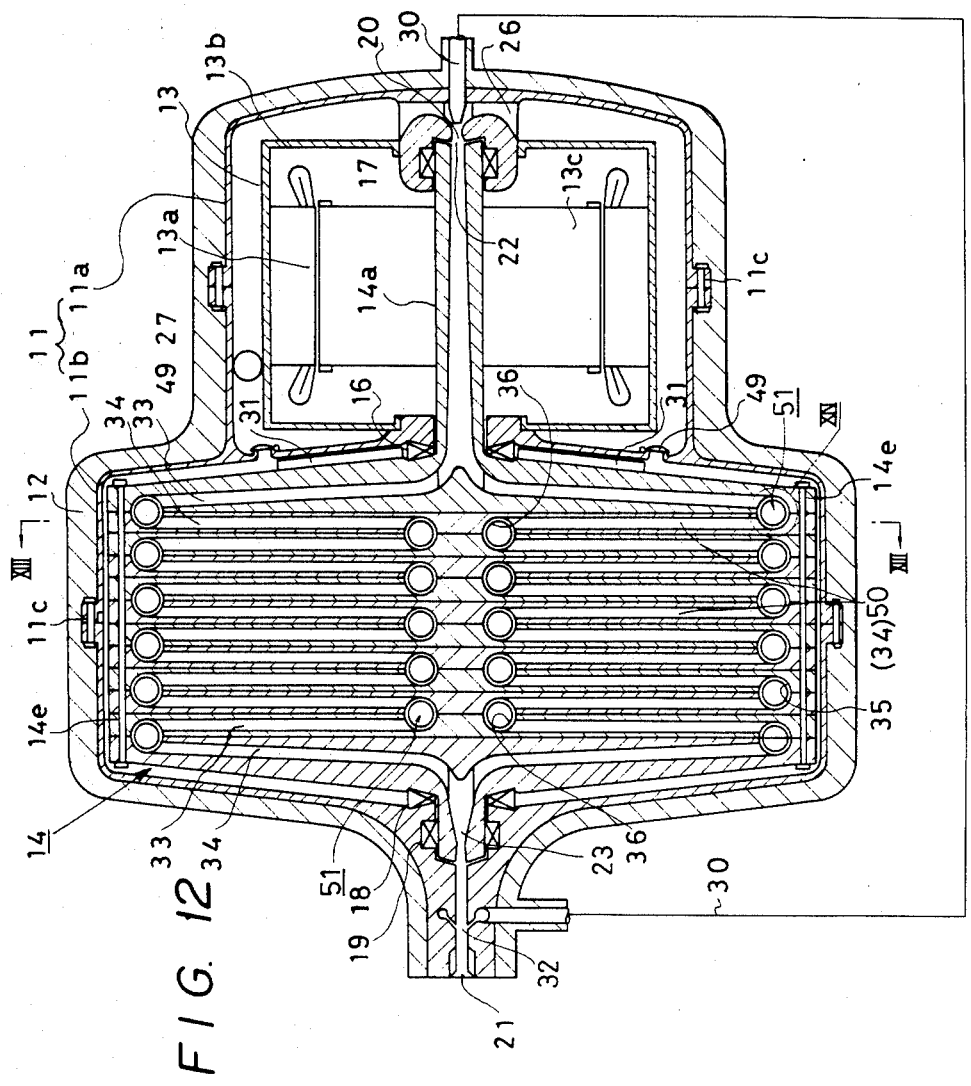
FIG. 12 is a longitudinal sectional view of a centrifugal compressor according to another embodiment of the present invention.

The centrifugal compression passages 33 are defined by compressor blades 37 which are shown in FIG. 2. The centrifugal compression passages 33 cause the gas to flow outward from the center of the rotor 14 due to the centrifugal force. Devices 40 for preventing the gas from rotating are provided in the lower portions of the circumferential diffusers 35, the centripetal passages 34, and the central diffusers 36 to feed the gas into the downstream central diffusers 36 from the circumferential diffusers 35. The devices 40 essentially function as deflectors which force the gas discharged from the centrifugal compression passages 33 into the central diffusers 36 through the circumferential diffusers 35. To this end, the devices 40 do not rotate together with the rotor 14 and are always located in the lower half of the arrangement shown in FIG. 1. In the course of deflection of the gas by the deflectors 40, a static head is produced. The deflectors 40 can be provided only in the circumferential diffusers 35 and the centripetal passages 34.

The construction of the devices 40 is illustrated in FIGS. 3 to 11. The gas flow rotation preventing device 40 is generally of sector in plan view and has a central shaft 41 at the center of the sector. The shaft 41 can be fitted in a central hole 14d of the rotor 14. The central shaft 41 can be made of an angular bearing. The device 40 has a rod portion 42 which is inserted in the corresponding central diffuser 36, a plate portion 43 which is fitted in the corresponding centripetal passage 34, and a rod portion 44 which is fitted in the corresponding circumferential diffuser 35, which are arranged in this order when viewed from the center of the sector. The rod portion 42, the plate portion 43 and the rod portion 44 interrupt the gas flow which tends to rotate in the central diffusers 36, the centripetal passages 34 and the circumferential diffusers 36 in the lower part of the rotor 14, and reverse the gas flow. The devices 40 are made of heavy materials, so that they do not rotate even under the friction due to the central hole 14d, the central diffusers 36, the centripetal passages 34 and the circumferential diffusers 35. In order to minimize or completely eliminate the friction between the devices 40 and the elements 14d, 36, 34, 35 etc. mentioned above contacting therewith, bearings 45 and gas passages 46 can be provided.

Each bearing 45 has three races, i.e. an inner race 45b around its supporting shaft 45a, an intermediate race 45c and an outer race 45d. Between the races are provided balls 45e to provide a double-construction bearing. This kind of double-construction bearing is suitable for high speed revolution, since even if the outer race 45d increases its number of revolution, the number of revolution of the balls 45 does not largely increase.

The rod portion 44 is provided with a recess 47 on the end face that interrupt the gas flow which tends to rotate forward by the rotation of the rotor 14. The gas passage 46 have at their one end inlet ports 46a which open into the recesses 47. The gas passages 46 extend in the corresponding rod portions 44 and open into the opposite sides of the rod portions 44, i.e. into the opposite sides of the rotor 14 when viewed in the axial direction, at their opposite ends which form injection ports 46b. The recesses 47 are adapted to effectively introduce the gas into the gas passages 46. Namely, the pressurized gas ejected from the injection ports 46 causes the rod portions 44 to float relative to the rotor 14 (the circumferential diffuser 35) in order to minimize the friction between the rod portions 44 and the corresponding circumferential diffusers 35. This results in an immovable maintenance of the gas flow rotation preventing devices 40 even during the rotation of the rotor 14 at high speed, in view of the relatively heavy weight of the devices 40. In the illustrated embodiment, although the bearings 45 and the gas passages 46 are provided only on the rod portions 44 which have a larger peripheral velocity, they can be provided also on the rod portions 42. Preferably, the devices 40 are made of magnetic materials, so that they can be attracted by a magnet which can be located outside the rotor 14 to hold the devices 40 at their initial positions.

When the rotor 14 is driven to rotate by the motor 13, the gas which passes through the centrifugal compression passages 33 in the rotor 14, the circumferential diffusers 35, the centripetal passages 34 and the central diffusers 36 is compressed by the compressor blades 37 and the gas flow rotation preventing devices 40. Thus, the gas which is introduced by the introduction port 27, radial passages 26, the inlet port 20 and the inlet pipe 14a into the rotor 14 is compressed and is discharged by the discharge pipe 14b and the outlet port 31. Namely, the devices 40 prevent the gas from rotating together with the rotor 14 in the circumferential diffusers 35, centripetal passages 34 and the central diffusers 36, when the gas comes into the circumferential diffusers 35 by the centrifugal force. As a result of this, the gas can be fed from the subsequent central diffusers 36 to the centrifugal compression passages 33. In these processes, the multistage compression of the gas takes place. In other words, the devices 40 reduce the velocity of the gas which tends to rotate at high speed and convert the kinetic energy of the gas into pressure, resulting in compression of the gas.

In this compression, the axial thrust in each compression stage of the rotor 14 can be cancelled and no reverse of the gas takes place between the compression stages. It is also possible to obtain highly pressurized compressed gas at a relatively small number of revolution of the rotor by increasing the number of stage of compression. The rotor 14 is made of superimposed plates which are connected to each other by fastening bolts 14e. Preferably, between the adjacent plates of the rotor 14 are located heat insulating layers 48 made of material having a low conductivity of heat to increase heat insulation efficiency. The heat insulating material 12 which covers the casing 11 also contributes to promotion of adiabatic change. It is also possible to coat the inner face of the casing 11 and the outer face of the rotor 14 with a heat reflecting material in order to reflect the radiation heat, thereby to promote the adiabatic change. Furthermore, in order to increase adiabatic compression efficiency, preferably the elements of the compressor of the present invention other than the motor 13 are made of materials having a small conductivity of heat, such as amber, or stainless steel, and the vacuum sealing devices 22, 23 and 32 and the bearings 16 to 19 are made of high speed steel, stellite (Trade Mark), or cemented carbide or the like, having a high wear proof. In particular, the bearings 16 to 19 are preferably oilless bearings. In addition, the devices 40 are preferably made of lead, amber, or stainless steel, so that they are heavy and have a small expansion coefficient.

When the amount of gas flow is restricted, since the gas is circulated to the inlet side through the bypass pipe 30 from the surging preventing vacuum sealing devices 32, as mentioned above, no surging takes place, resulting in a stable and reliable operation of the compressor.

It is possible to provide, in the bypass pipe 30, a check valve (not shown) for preventing the gas from flowing from the vacuum sealing device on the inlet side to the surging preventing vacuum sealing devices 32, and a pressure sensor (not shown) for controlling the drive of the rotor.

It is also possible to provide a safety valve or the like which opens when the pressure is above a predetermined value, in the passages of the highly pressurized gas.

It is possible to control the check valve 49 which opens when the gas flow is restricted, so that the gas is circulated to the inlet side from the vacuum sealing devices 23 on the outlet side between the casing 11 and the discharge pipe 14b. This is an alternative simplest solution to prevention of surging. In this alternative, it is preferable to provide centrifugal compressor blades 31 outside the rotor 14 in order to prevent the high temperature gas from flowing into the motor 13.

FIGS. 12 to 16 show a second embodiment of the present invention. In the second embodiment, means for preventing the gas which comes to the circumferential diffusers 35 from rotating together with the rotor 14 is different from that in the first embodiment mentioned above. Namely, the means for preventing the gas from rotating in the second embodiment is constructed by centripetal inoperative blades 50 in the centripetal passages 34. "Inoperative" referred to connotes that the blades 50 does not compress the gas. Also in the second embodiment, devices 51 of prevention of rotation of gas flow are provided in the circumferential diffusers 36 and in the central diffusers 36, respectively, unlike the first embodiment. Except for the foregoing, the second embodiment substantially corresponds to the first embodiment. The corresponding elements in the second embodiment are designated by the corresponding numerals for those in the first embodiment.

The rotation preventing devices 51 interrupt the gas which tends to flow in the direction of the rotation of the rotor 14 and reverse the gas flow, so that the gas flow from the centrifugal compression passages 34 toward the centripetal passages 34 takes place. The inoperative blades 50 cause an absolute velocity vector of the flowing gas to be always directed to the center, so that the gas flow in the circumferential diffusers 35 can be introduced into the central diffusers 36 without changing the pressure head.

Figure 13:
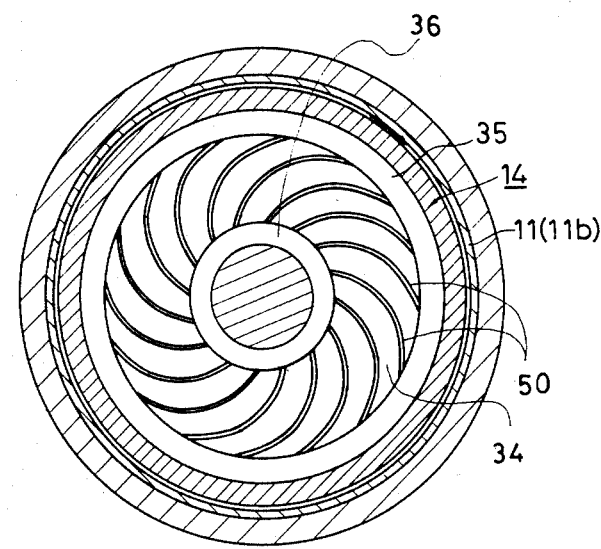
FIG. 13 is a sectional view taken along the line XIII—XIII in FIG. 12.

FIG. 13 shows an example of the shape of the centripetal inoperative blades 50. The centripetal inoperative blades 50 introduce the compressed gas into the central diffusers without changing the pressure head. Preferably, the blades 50 are provided, on their inlet portions, with nozzles which ensures an adiabatic expansion to provide a high speed gas flow. The blades 50 function as turbine blades or compressor blades when the velocity of the gas changes, resulting in a change of ratio between the velocity and the number of revolution of the rotor 14.

Figure 14:
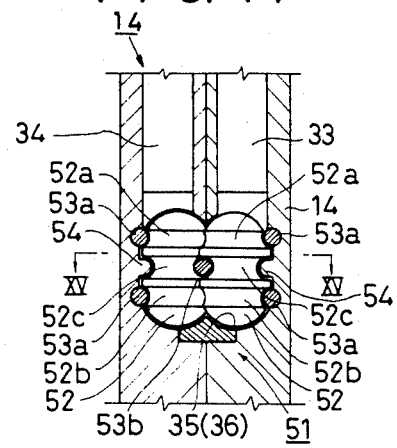
FIG. 14 is an enlarged view of a part designated by XIV in FIG. 12.
Figure 15:
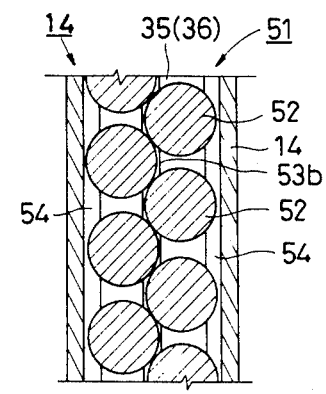
FIG. 15 is a partial developed view taken along the line XV—XV in FIG. 14.

FIGS. 14 and 15 show an embodiment of the device 50 for preventing the forward rotation of the gas flow. Although the devices 51 are provided in both the circumferential diffusers 35 and the central diffusers 36 in the illustrated embodiment, the devices 51 can be provided only in the circumferential diffusers 35. In the illustrated embodiment, the device 51 is composed of a number of balls 52 which have generally elliptical cross section and which lie on the entire circumferences of the circumferential diffuser 35 and the central diffuser 36. These balls 52 are partially solid balls and partially hollow balls. Namely, for example, one third of the balls 52 are relatively heavy solid balls, and the remainder are relatively light hollow balls. By the difference in weight between the balls, the heavier aligned balls are located in the lower portions of the annular circumferential diffusers and the central diffusers due to the gravity, and accordingly the balls can be entirely held at their initial positions in the circumferential diffusers 35 and the central diffusers 36. In the second embodiment, it is also possible to hold the balls 52 at their initial positions with the help of magnetic force (not shown).

Each of the balls 52 is shaped so that the gap between the ball and the circumferential (and central) diffuser 35 (and 36) is minimized. Each ball 52 has upper, lower and intermediate annular grooves 52a, 52b and 52c. These balls are located along two lines in zigzag fashion in a developed view. Annular guide rails 53a secured to the rotor 14 are fitted in the upper and lower annular grooves 52a and 52b, and projections 54 integral with the rotor 14 (the circumferential diffuser and the central diffuser) are fitted in the intermediate annular grooves 52c, respectively. Between the two rows of balls 52 is provided a free annular guide rail 53b to enable the balls 52 to freely rotate and to prevent the balls from falling down.

At the accerelation moment of the rotor 14, the inertia of the annular guide rail 53b contributes to the maintenance of the balls at their initial position. With this arrangement, the balls 52 are subject only to rolling friction, resulting in a decreased friction acting on the balls 52. The balls 52 and the guide rails 53a and 53b are preferably made of high speed steel, stellite, or cemented carbide or the like.

Figure 16:
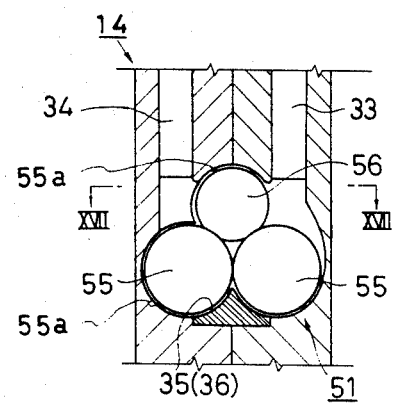
FIG. 16 is a partial enlarged view corresponding to FIG. 14, showing another embodiment of means for preventing the gas flow from rotating.
Figure 17:
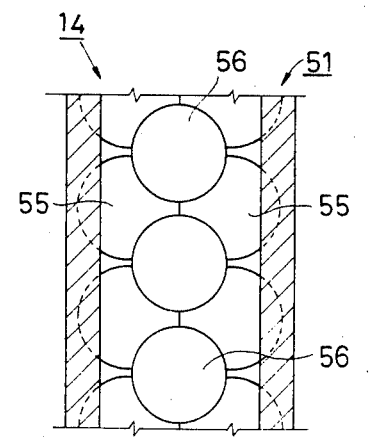
FIG. 17 is a sectional view taken along the line XVII—XVII in FIG. 16.

FIGS. 16 and 17 show another embodiment of the device 51 for preventing the rotation of the gas flow. In the device 51 shown in FIGS. 16 and 17, two rows of main balls 55 are arranged between the guide rails 55a, 55a in the circumferential diffuser 35 (central diffuser 36) and auxiliary balls 56 are located between the main balls so as to bridge the main balls 55. The main balls 55 and the auxiliary balls 56 are arranged over the entire circumference of the circumferential diffuser 35 (central diffuser 36), similarly to the balls 52 having elliptical cross section shown in FIGS. 14 and 15.

Also similarly to balls 52 illustrated in FIGS. 14 and 15, a part, for example, one third of the main balls 55 and the auxiliary balls 56 are heavy solid balls and the remainder are light hollow balls, so that the heavier balls 55 and 56 locate in the lower portions of the circumferential diffuser 35 (the central diffuser 36) to maintain the entirely of the balls at their initial positions.

It should be noted that the main balls 55 and the auxiliary balls 56 come into contact with the adjacent main balls or auxiliary balls at one point and rotate only with rolling friction while contacting with the guide rails 55a as the rotor 14 rotates. Accordingly it is possible to maintain the balls at their initial positions with decreased friction. The main balls 55 and the auxiliary balls 56 are preferably made of lead, amber, stainless steel, titanium or titanium alloy or the like.

When appropriate gaps are provided between the balls 52 (FIGS. 14, 15), between the main balls 55 (FIGS. 16, 17) and between the auxiliary balls 56 (FIGS. 16, 17), the gaps enable the gas to flow from the centrifugal compression passages 33 to centripetal passages 34 and vice versa.

The heavier aligned balls 52, 55, 56 locate in the lower portions of the circumferential diffuser 35 (the central diffuser 36) when the rotor 14 is in a stable operational position, as mentioned before. Alternatively, it is also possible to use an automatic frequency converter in order to drive the motor 13 in such a way that the number of revolution of the rotor 14 is gradually increased, resulting in a stable operation of the rotor even at the initial stage of the operation.

Figure 18:
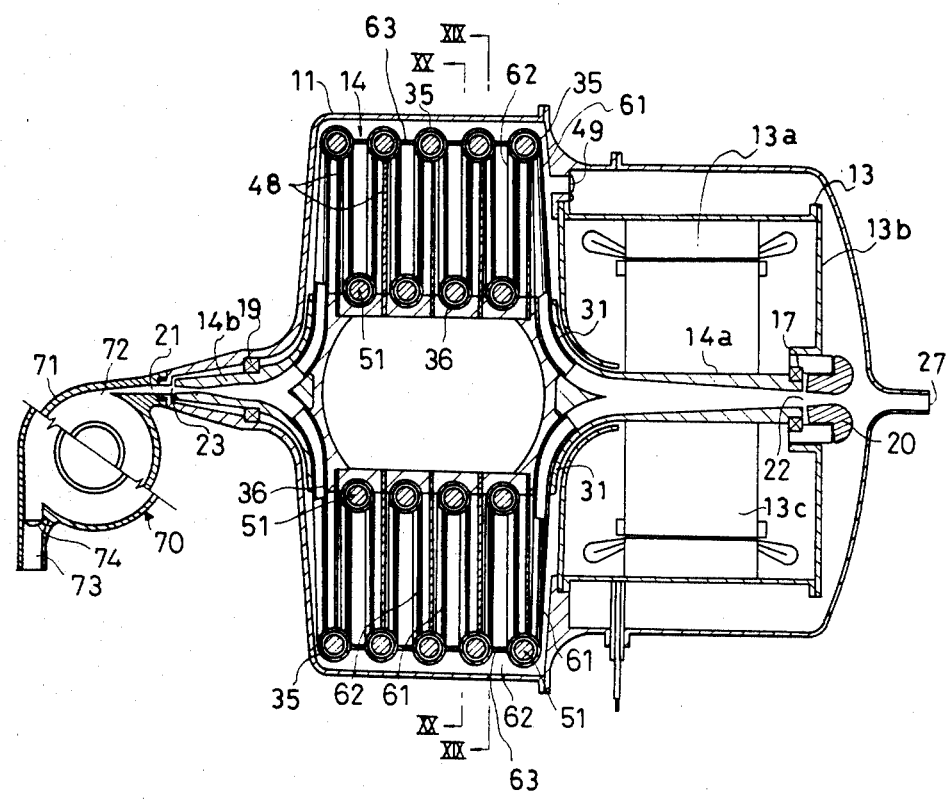
FIG. 18 is a longitudinal sectional view of a centrifugal compressor according to still another embodiment of the present invention.
Figure 19:
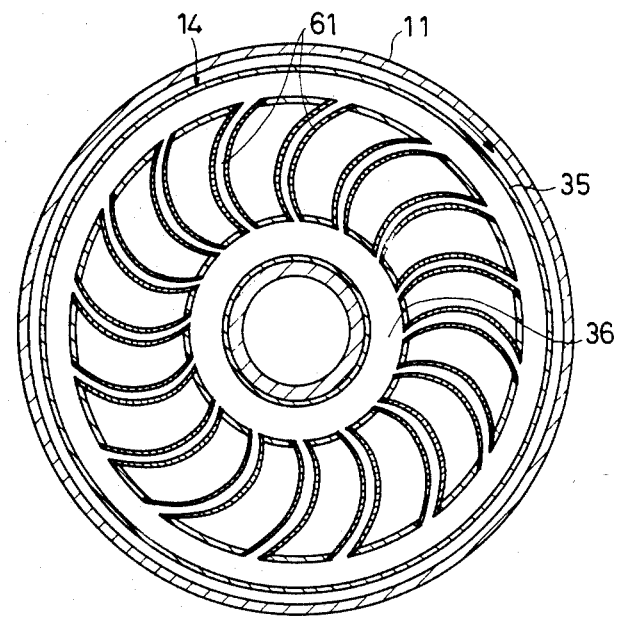
FIGS. 19 and 20 are sectional views taken along the lines XIX—XIX and XX—XX in FIG. 18, respectively.
Figure 20:
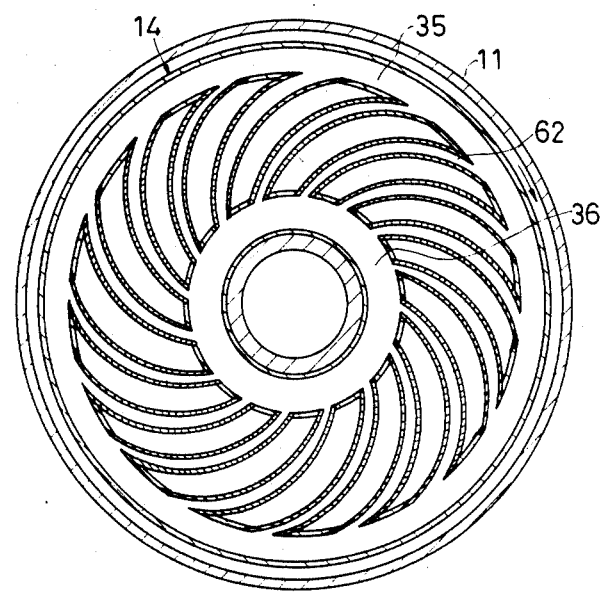
Figure 21:
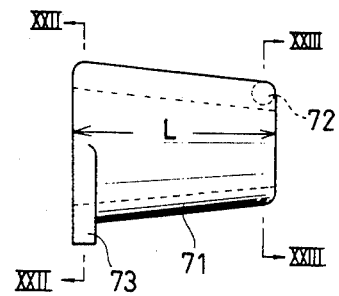
FIG. 21 is a front elevational view of a centrifugal speed reducing and pressure increasing device.
Figure 22:
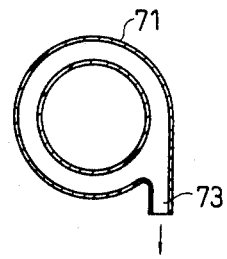
FIGS. 22 and 23 are sectional views taken along the lines XXII—XXII and XXIII—XXIII in FIG. 21; and, FIG. 24 is a schematic view of a centrifugal compressor of the present invention which is used as an underground heat exchanger.
Figure 23:
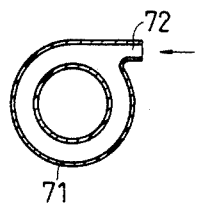

FIGS. 18 to 20 show the third embodiment of the present invention. In this third embodiment, the centrifugal compression passages 33 with the compressor blades 37, and the centripetal passages 34 with the centripetal inoperative blades 50 in the second embodiment mentioned above are composed of centrifugal compression pipes 61 and centripetal inoperative pipes 62, respectively. The circumferential diffusers 35 and the central diffusers 36, connected to the pipes 61 and 62 in the second embodiment are also formed as pipes in the third embodiment. Except for the foregoing features, the arrangement of the third embodiment is substantially identical to that of the second embodiment mentioned before. Heat insulating layers 48 are provided between the centrifugal compression pipes 61 and the centripetal inoperative pipes 62.

The circumferential diffusers 36 are reinforced by reinforcing plates 63 therebetween.

FIGS. 19 and 20 exemplify the shapes of the centrifugal compression pipe 61 and of the centripetal inoperative pipe 62 in plan views. The shapes shown in FIGS. 19 and 20 are approximately same as those of the compressor blades 37 shown in FIG. 2 and the centripetal inoperative blades 50 shown in FIG. 13, respectively. This kind of pipe construction simplifies and lightens the rotor 14, so that the starting torque of the motor 13 can be small, resulting in an easy and quick accereelation of the rotor 14.

Furthermore, according to the third embodiment, a centrifugal speed increasing and pressure decreasing device 70 is provided in the outlet pipe 31 of the casing 11. The centrifugal speed increasing and pressure decreasing device 70 can be also provided in the arrangements of the first and second embodiments mentioned before. The device 70 has an annular cylinder 71 with closed opposite ends, having a predetermined height L, as shown in FIGS. 18 and 21 to 23. The cylinder 71 is provided, on its one end, with an inlet pipe 72 connected thereto and extending in a substantially tangential direction of the cylinder 71, and on its opposite end with a discharge pipe 72 which is connected to the cylinder 71 and which extends in a substantially tangential direction of the cylinder and in a direction of the rotation of the gas flow in the cylinder 71. The discharge pipe 73 has a diameter larger than that of the inlet pipe 72. The diameter of the passage of the annular cylinder 71 is larger than that of the discharge pipe 73. The inlet pipe 72 is connected to the discharge pipe 21 of the casing 11, and the discharge pipe 73 has a check valve 74 therein. The annular cylinder 71 has preferably a conicalfrustum double-pipe construction, so that diameter of the cylinder 71 gradually increases toward the discharge end from the inlet end. Alternatively, the annular cylinder 71 can be made of a circular cylindrical tube with closed opposite ends or a hollow conicalfrustum. In addition to the foregoing, the cylinder 71 is preferably covered with a proper heat insulating layer.

The kinematic energy of the gas which enters the annular cylinder 71 at a high speed (e.g. at a supersonic speed) is converted to the rotational movement of the gas in the cylinder 71. The inertia of the rotation of the gas enables the gas to be easily introduced in the cylinder 71, so that no shock wave takes places. During repetition of the rotation of the gas flow in the cylinder 71 between the inlet pipe 72 and the discharge pipe 73, the gas flow is reduced in its speed by the friction between the gas flow and the inner peripheral wall of the passage of the annular cylinder 71 due to the centrifugal force, so that the speed of the gas flow is below the sonic speed and that the pressure of the gas is highly raised. Namely, the high speed gas flow is reduced in the annular cylinder 71 and consequently the dynamic pressure thereof is decreased and the static pressure thereof is increased. As a result of this, the gas flow of high pressure and low speed can be discharged from the discharge pipe 73. This is an adiabatic change and an isentropic change. Namely, the gas of low enthalpy which enters the annular cylinder 71 is converted to the gas of high enthalpy which is discharged from the annular cylinder 71. The gas discharged from the annular cylinder has the enthalpy equivalent to the enthalpy of the gas immediately before the vacuum sealing device 23.

It should be noted here that since the annular cylinder has a larger diameter at its outlet end, as mentioned above, the centrifugal force of the gas closer to the outlet end of the annular cylinder 71 is larger than that of the gas closer to the inlet end of the annular cylinder 71, and accordingly the pressure of the gas closer to the inlet end of the annular cylinder is lower than that of the gas adjacent to the outlet end thereof. This not only ensures that the gas can be easily introduced into the annular cylinder 71, but also enables the pressure of the gas to be effectively increased. Furthermore, the high speed gas flow can be prevented from being recompressed and the vacuum sealing effect can be increased.

In the illustrated embodiment, the annular cylinder 71 is of double-tube construction and accordingly the gas can not be reversed. The check valve 74 prevents the gas from flowing reversely, for example, when the compressor stops operation.

As can be seen from the above discussion, according to the present invention the centrifugal speed reducing and pressure increasing device can prevent the occurrence of the shock wave and the recompression of the gas, in the course of recovery of the enthalpy of the high speed gas which is ejected from the vacuum sealing device.

The applicability of the compressor according to the present invention is not limited to any particular industrial field.

The compressor according to the present invention can be used for example with an underground heat exchanger.

Figure 24:
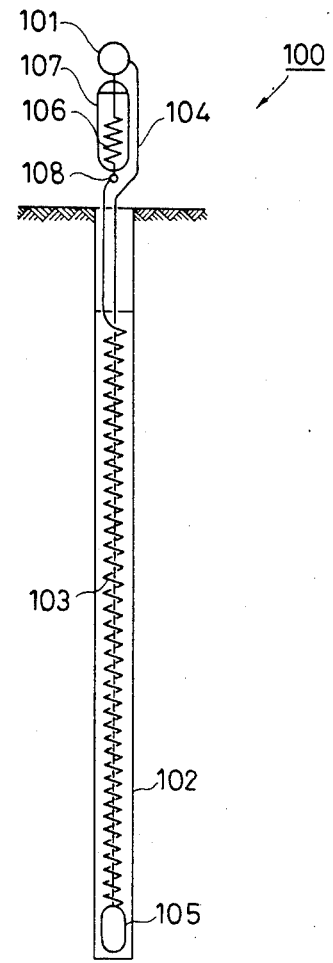

FIG. 24 shows one example of such a heat exchanging apparatus 100 with the compressor 101 of the present invention.

In FIG. 24, the heat exchanging apparatus 100 has an heat exchanger unit 103 which includes pipe assembly in which a gaseous coolant is enclosed. The unit 103 is located in a bore 102 formed in the underground. The heat exchanger unit 103 is connected to an overground circulation circuit 104, so that the coolant is circulated in the heat exchanger unit and the circulation circuit 104. At the bottom end of the heat exchanger unit 103 is provided a liquidized coolant reservoir 105.

The centrifugal compressor 101 according to the present invention can be used to compress the coolant which is gasified in the heat exchanger unit 103 in order to liquidize the gaseous coolant. In the heat exchanging apparatus 100 shown in FIG. 24, the heat exchange takes place between the underground heat exchanger unit 103 and an overground heat exchanging unit 106 which is located between the centrifugal compressor 101 and the underground heat exchanger unit 103.

As the result of heat exchange, for example, hot water can be stored in a water tank 107. The numeral 108 designates an expansion valve per se known between the underground heat exchanger unit 103 and the overground heat exchanger unit 106.

Since a large amount of lubricant which otherwise would clog the circulating pipes or gas passages can not remain therein, the centrifugal compressor according to the present invention can be particularly advantageously used with the heat exchanging apparatus as mentioned above, so that the coolant can be smoothly compressed and circulated without need for a large drive.

As can be understood from the above discussion, according to the present invention, since the rotor per se which is rotatably supported in the casing and which is driven by the motor is provided with the centrifugal compression passages, the centripetal passages, and the circumferential diffusers and since the outlet port or the discharge port of the compressed gas is provided in the shaft of the rotor, the compressor is free from the problem of leakage of the gas. Namely, the centrifugal compressor of the present invention can eliminate the disadvantages of the prior art, such as leakage loss, mechanical loss, and friction loss between compressor blades and a fixed casing.

Thus, the centrifugal compressor according to the present invention has a highly effective compression efficiency. Furthermore, according to the present invention, a small and light centrifugal compressor having a high compression ratio can be realized. The centrifugal compressor according to the present invention is useful particularly for an air conditioner, refrigeration system or a hot water supply system, etc.

I claim:

1. A multistage centrifugal compressor having a rotor which is driven to rotate about a center shaft by a drive, said rotor comprising an inlet opening at one end of the center shaft; at least one centrifugal compression passage connected to the inlet opening and extending radially outward from the center shaft; at least one annular circumferential diffuser connected to the outer end of the centrifugal compression passage; at least one centripetal passage extending from the circumferential diffuser toward the center shaft; an outlet opening at the opposite end of the center shaft, connected to the centripetal passage; and means for preventing a gas to be compressed from rotating in the circumferential diffuser;

said compressor having vacuum sealing means at connections between the casing and the inlet opening and/or the outlet opening for providing a high speed gas flow passing through the connections.

2. A compressor according to claim 1, wherein it is a multistage compressor and wherein said rotor comprises a plurality of centrifugal compression passages, a plurality of circumferential diffusers, and a plurality of centripetal passages.

3. A centrifugal compressor according to claim 2, further comprising annular central diffusers to which the inner ends of the adjacent centripetal passages and the centrifugal compression passages are connected.

4. A centrifugal compressor according to claim 2 or 3, wherein said preventing means is located in the circumferential diffusers and partially in the centripetal passages to prevent the gas from rotating during the rotation of the rotor.

5. A centrifugal compressor according to claim 2 or 3, wherein said preventing means is located in the circumferential diffusers, in the centripetal passages, and partially in the central diffusers to prevent the gas from rotating during the rotation of the rotor.

6. A centrifugal compressor according to claim 2 or 3, wherein said preventing means is located in both the centrifugal diffusers and the central diffusers to prevent the gas from rotating in the respective diffusers during the rotation of the rotor.

7. A multistage centrifugal compressor having a rotor which is driven to rotate about a center shaft by a drive, said rotor comprising an inlet opening at one end of the center shaft; at least one centrifugal compression passage connected to the inlet opening and extending radially outward from the center shaft; at least one annular circumferential diffuser connected to the outer end of the centrifugal compression passage; at least one centripetal passage extending from the circumferential diffuser toward the center shaft; an outlet opening at the opposite end of the center shaft, connected to the centripetal passage; and means for preventing a gas to be compressed from rotating in the circumferential diffuser;

said rotor including a plurality of centrifugal compression passages, a plurality of circumferential diffusers, and a plurality of centripetal passages;

said compressor also including annular central diffusers to which the inner ends of the adjacent centripetal passages and the centrifugal compression passages are connected; and, centripetal inoperative blades in the centripetal passages for introducing the gas flow into the central diffusers without changing the pressure head of the gas flow.

8. A multistage centrifugal compressor having a rotor which is driven to rotate about a center shaft by a drive, said rotor comprising an inlet opening at one end of the center shaft; at least one centrifugal compression passage connected to the inlet opening and extending radially outward from the center shaft; at least one annular circumferential diffuser connected to the outer end of the centrifugal compression passage; at least one centripetal passage extending from the circumferential diffuser toward the center shaft; an outlet opening at the opposite end of the center shaft, connected to the centripetal passage; and means for preventing a gas to be compressed from rotating in the circumferential diffuser;

said rotor including a plurality of centrifugal compression passages, a plurality of circumferential diffusers, and a plurality of centripetal passages;

said compressor also including annular central diffusers to which the inner ends of the adjacent centripetal passages and the centrifugal compression passages are connected;

said compressor having a bypass pipe connecting the inlet opening and the outlet opening of the rotor and having a restriction which enables the gas passing therethrough to be ejected as a jet to prevent surging.

9. A centrifugal compressor according to claim 7, wherein said centripetal inoperative blades are provided on its inlet end, with nozzles for increasing the speed of gas passing therethrough.

10. A centrifugal compressor according to claim 3 or claim 7, wherein said centrifugal compression passages and the centripetal passages are comprised of pipes.

11. A centrifugal compressor according to claim 3 or claim 7, wherein said circumferential diffusers are comprised of pipes.

12. A centrifugal compressor according to claim 3 or claim 7, wherein said central diffusers are comprised of pipes.

13. A centrifugal compressor according to claim 7 or claim 8, further comprising vacuum sealing means at connections between the casing and the inlet opening and/or the outlet opening for providing a high speed gas flow passing through the connections.

14. A centrifugal compressor according to claim 7 or claim 8, wherein said drive for rotating the rotor is an electrically driven motor.

15. A centrifugal compressor according to claim 14, wherein said motor is enclosed in the casing.

16. A centrifugal compressor according to claim 7 or claim 8, further comprising a bypass pipe connecting the inlet opening and the outlet opening of the rotor and having a restriction which enables the gas passing therethrough to be ejected as a jet to prevent the surging.

17. A centrifugal compressor according to claim 3 or claim 7, wherein said casing has an outlet port connected to the outlet opening of the center shaft of the rotor, and further comprising centrifugal means for reducing the speed and increasing the pressure of the gas, said centrifugal means comprising a cylindrical pipe with closed opposite ends, at the outlet port of the casing; an inlet pipe at one end of the cylindrical pipe, connected to the outlet port of the casing and extending in a substantially tangential direction of the cylindrical pipe; an outlet pipe at the opposite end of the cylindrical pipe, opening into the cylindrical pipe in a direction of the rotation of the gas flow in the cylindrical pipe and extending in a substantially tangential direction of the cylindrical pipe.

18. A centrifugal compressor according to claim 17, wherein said cylindrical pipe has an outer diameter gradually increasing toward the outlet pipe from the inlet pipe.

19. A centrifugal compressor according to claim 17, wherein said cylindrical pipe is comprised of an annular cylinder of substantially conicalfrustum, with closed opposite ends.

20. A centrifugal compressor according to claim 1 or claim 7 or claim 8, wherein said casing is covered with a heat insulating material.

21. A centrifugal compressor according to claim 1 or claim 7 or claim 8, wherein said casing is coated at its inner face with a heat reflecting material for reflecting the radiation heat.

22. A centrifugal compressor according to claim 1 or claim 7 or claim 8, wherein said rotor is coated at its outer face, with a heat reflecting material for reflecting the radiation heat.

23. A centrifugal compressor according to claim 17, wherein said centrifugal means is covered with a heat insulating material.

24. A centrifugal compressor according to claim 3 or claim 7 or claim 8, further comprising heat insulating layers between the centrifugal compression passages and the centripetal passages adjacent thereto.

* * * * *